United States Patent [19]
Nicholson et al.

[11] Patent Number: 5,597,587
[45] Date of Patent: Jan. 28, 1997

[54] APPARATUS FOR THE MANUFACTURE OF CELLULOSE FOOD CASING

[75] Inventors: Myron D. Nicholson, Lemont; Edward M. Kajiwara, Skokie; Paul E. Ducharme, Jr., Tinley Park; Merlan E. McAllister, Clarendon Hills; Joseph R. Walta, Lagrange, all of Ill.

[73] Assignee: Viskase Corporation, Chicago, Ill.

[21] Appl. No.: 412,677

[22] Filed: Mar. 29, 1995

Related U.S. Application Data

[62] Division of Ser. No. 135,647, Oct. 14, 1993, abandoned, which is a division of Ser. No. 822,506, Jan. 17, 1992, Pat. No. 5,277,857.

[51] Int. Cl.$^6$ .................................................. B29C 47/88
[52] U.S. Cl. ...................... 425/71; 264/178 R; 264/183; 264/187; 264/188; 425/380; 425/404; 425/445; 425/461; 425/467
[58] Field of Search ............... 425/71, 380, 404, 425/445, 461, 467; 264/178 R, 183, 187, 188

[56] References Cited

U.S. PATENT DOCUMENTS

| | | |
|---|---|---|
| 2,070,247 | 2/1937 | Weingand et al. . |
| 2,141,776 | 12/1938 | Vautier et al. . |
| 2,144,899 | 1/1939 | Smith . |
| 2,176,925 | 10/1939 | Reichel et al. . |
| 2,179,181 | 11/1939 | Graenacher et al. . |
| 2,227,682 | 1/1941 | Wade . |
| 3,106,471 | 10/1963 | Firth . |
| 3,142,092 | 7/1964 | Ralston ..................................... 425/71 |
| 3,193,547 | 7/1965 | Schott, Jr. ................................. 425/71 |
| 3,334,168 | 8/1967 | Majewski et al. . |
| 3,402,682 | 9/1968 | Peden et al. . |
| 3,447,939 | 6/1969 | Johnson . |
| 3,655,846 | 4/1972 | Kanoh et al. ............................ 425/71 |
| 3,819,776 | 6/1974 | Robinson et al. ........................ 425/71 |
| 3,976,410 | 8/1976 | Jack et al. ................................ 425/71 |
| 4,003,973 | 1/1977 | Kurokawa et al. ....................... 425/71 |
| 4,060,361 | 11/1977 | Ziolko . |
| 4,138,503 | 2/1979 | Ziolko . |
| 4,142,913 | 3/1979 | McCorsley, III et al. . |
| 4,144,080 | 3/1979 | McCorsley, III . |
| 4,145,532 | 3/1979 | Franks et al. . |
| 4,195,054 | 3/1980 | Verellen et al. . |
| 4,196,282 | 4/1980 | Franks . |
| 4,201,532 | 5/1980 | Cole ........................................ 425/380 |
| 4,203,942 | 5/1980 | Sims, Jr. et al. ......................... 425/71 |
| 4,246,221 | 1/1981 | McCorsley, III . |
| 4,255,300 | 3/1981 | Franks et al. . |
| 4,317,794 | 3/1982 | Gord et al. . |
| 4,323,627 | 4/1982 | Joh . |
| 4,416,698 | 11/1983 | McCorsley, III . |
| 4,426,228 | 1/1984 | Brander et al. . |
| 4,833,183 | 5/1989 | Vandenberg . |

FOREIGN PATENT DOCUMENTS

| | | |
|---|---|---|
| 1171615 | 7/1984 | Canada . |
| 006601 | 1/1980 | European Pat. Off. . |
| 1218706 | 2/1961 | Germany ............................. 425/380 |
| 43-20772 | 9/1968 | Japan .................................... 425/380 |
| 642200 | 1/1979 | U.S.S.R. ............................... 425/380 |
| 1144759 | 3/1969 | United Kingdom . |
| WO95/07811 | 3/1995 | WIPO . |

Primary Examiner—Robert Davis
Assistant Examiner—Joseph Leyson
Attorney, Agent, or Firm—Roger Aceto

[57] ABSTRACT

An apparatus to manufacture a cellulose food casing including a nonderivatized cellulose film precipitated in tubular form from an extruded thermoplastic solution of cellulose and an amine oxide cellulose solvent.

7 Claims, 3 Drawing Sheets

APPARATUS FOR THE MANUFACTURE OF CELLULOSE FOOD CASING

This application is a division of prior U.S. application Ser. No. 08/135,647, filed Oct. 14, 1993 now abandoned, which is a division of prior U.S. application Ser. No. 07/822,506, filed Jan. 17, 1992, now U.S. Pat. No. 5,277,857, issued Jan. 11, 1994.

TECHNICAL FIELD

The present invention relates to apparatus for extruding and regenerating a thermoplastic cellulose solution to form a tubular cellulose food casing.

BACKGROUND OF THE INVENTION

Cellulose food casings are well known in the art and are widely used in the production of stuffed food products such as sausages and the like. Cellulose food casings generally are seamless tubes formed of a regenerated cellulose and contain a plasticizer such as water and/or a polyol such as glycerine. Plasticization is necessary because otherwise the cellulose tube is too brittle for handling and commercial use.

Cellulose food casings generally are used in one of two forms. In one form the casing consists of a tubular film of pure regenerated cellulose having a wall thickness ranging from about 0.025 mm to about 0.076 mm and made in tube diameters of about 14.5 mm to 203.2 mm. The second form is a reinforced casing wherein the tubular wall of the casing consists of a regenerated cellulose bonded to a paper web. Such reinforced casings are commonly called "fibrous" casings to distinguish them from the nonreinforced cellulose casings. Fibrous casings have a wall in the range of 0.050 mm to 0.102 mm thick and are made in diameters of about 40.6 mm to 193 mm or greater.

The cellulose for making both types of casings is most commonly produced by the so called "viscose process" wherein viscose, a soluble cellulose derivative, is extruded as a tubular film through ah annular die into coagulating and regenerating baths to produce a tube of regenerated cellulose. This tube is subsequently washed, plasticized with glycerine or other polyol, and dried. Drying usually is accomplished while the tube is inflated with air at a pressure sufficient both to maintain a constant tube diameter and to orient the film.

The viscose process for making cellulose is well known in the art. Briefly, in the viscose process a natural cellulose such as wood pulp or cotton litters first is treated with a caustic solution to activate the cellulose to permit derivatization and extract certain alkali soluble fractions from the natural cellulose. The resulting alkali cellulose is shredded, aged and treated with carbon disulfide to form cellulose xanthate which is a cellulose derivative. The cellulose xanthate is dissolved in a weak caustic solution. The resulting solution or "viscose" is ripened, filtered, deaerated and extruded. The pulp source and time of aging the alkali cellulose are selected depending upon whether the viscose will be used to make fibrous casing or nonreinforced cellulose casing. For fibrous casing the selection is such that a less viscous solution is used. The lower viscosity solution wicks into the paper web allowing complete penetration of the viscose for establishing strong intercellulose bonding. For extrusion of a nonreinforced cellulose casing, the selection is such that a more viscous, solution is used.

The viscose is extruded as a tube through an annular die and about a self centering mandrel into coagulation and regenerating baths containing salts and sulfuric acid. In the acidic baths the cellulose xanthate, e.g. viscose, is converted back to cellulose. In this respect, the acid bath decomposes the cellulose xanthate with the result that a pure form of cellulose is coagulated and regenerated. Initially, the coagulated and regenerated cellulose is in a gel state. In this gel state the cellulose tube first is run through a series of rinse water dip tanks to remove by-products formed during regeneration. The gel tube then is treated with a glycerine humectant and dried to about 10% moisture based on total casing weight. As noted above, the gel tube is inflated during the drying process to a pressure sufficient to provide a degree of orientation to the dried cellulose tube.

Both nonreinforced cellulose casings and fibrous casings are produced in this fashion except in the case of fibrous casings the viscose is extruded onto a tube of paper prior to entering the coagulation and regenerating baths.

During regeneration of the cellulose from the xanthate solution, sulfur products are liberated and gases such as hydrogen sulfide, carbon disulfide and carbon dioxide are released through both the inner and outer surfaces of the gel tube. It should be appreciated that the gases produced as by-products during regeneration are noxious and toxic so their containment and recovery imposes a considerable burden on the manufacturing process. Moreover, gases generated at the internal surface of the extruded tube can accumulate within the tubular casing and consequently present special problems. The tubular casing while in its gel state is expansible and the pressure build up of gases accumulating within the gel casing causes undesirable diameter variations. To prevent this, the gel casing is punctured periodically to vent the accumulated gases. This puncturing process, involving procedures no puncture, vent, and then seal the punctured gel tube, results in an undesirable interruption of the manufacturing process. Also, gases which evolve within the casing wall may become entrapped causing bubbles which weaken the casing and detract from its stuffability.

Also, the casing in its gel state to some extent retains low residual levels of the sulfur compounds produced during regeneration. While care is taken to remove all residual sulfur compounds by washing the gel tube prior to drying, the dried casing may still contain trace amounts of these compounds.

Despite the problems inherent with the viscose process as described above, it nevertheless remains today as the most commonly used process for the production of cellulose casing for the food processing industry.

An alternate cellulose production method involves forming a cellulose solution by means of a simple dissolution rather than requiring prior derivatization to form a soluble substance (as in the viscose process). A cellulose dissolution process is described in U.S. Pat. No. 2,179,181. This patent discloses the dissolution of natural cellulose by a tertiary amine oxide to produce solutions of relatively low solids content, for example 7 to 10% by weight cellulose dissolved in 93 to 90% by weight of the tertiary amine oxide. The cellulose in the resulting solution is nonderivatized prior to dissolution. U.S. Pat. No. 3,447,939 discloses use of N-methyl-morpholine-N-oxide (NMMO) as the cyclic amine oxide solvent wherein the resulting solutions, while having a low solids content, nevertheless can be used in chemical reactions involving the dissolved compound, or to precipitate the cellulose to form a film or filament.

More recent patents such as U.S. Pat. Nos. 4,145,532 and 4,426,288 improve upon the teachings of the '939 Patent. U.S. Pat. No. 4,145,532 discloses a process for making a solution of cellulose in a tertiary amine oxide such as NMMO which contains 10–35% by weight of cellulose. This higher solids content, achieved in part by including an amount of water (from 1.4% to about 29% by weight) in the tertiary amine oxide solvent, provides a solution adapted for shaping into a cellulosic article such as by extrusion or spinning. In U.S. Pat. No. 4,426,288 the NMMO-cellulose solution contains an additive which reduces decomposition of the cellulose polymer chain so that molding or spinning substances are obtained with only slight discoloration and which will yield molded shapes distinguished by improved strengths upon precipitation in a nonsolvent such as water.

Using NMMO as a solvent for cellulose eliminates the need for derivatizing the cellulose, as in the viscose process. Consequently it eliminates the disadvantages attendant to the viscose process such as the problems associated with the generation of toxic and noxious gases and sulfur compounds.

However, while nonderivatized cellulose resulting from the process of dissolving cellulose in NMMO eliminates certain problems associated with the viscose process, to applicant's knowledge, NMMO-cellulose solutions heretofore have not been used in the manufacture of cellulose food casings. This perhaps is due in part to the fact that the nonderivatized cellulose solution is thermoplastic with a melting point of about 65° C. so it is normally solid at the temperature heretofore used in the extrusion of viscose (e.g. cellulose xanthate) for producing cellulose food casings. Also, the nonderivatized cellulose solution at 65° C. has a viscosity significantly higher than the viscosity of the derivatized cellulose heretofore used in the production of cellulose food casings. In particular, nonderivatized cellulose in solution may have a molecular weight of about 80,000 to 150,000 and a viscosity in the range of about 60,000 to 100,000 centipoises. The high molecular weight and viscosity is because the dissolution of the cellulose does not affect the degree of polymerization. Viscose for casing manufacture (wherein the degree of polymerization is affected by derivatization) has a molecular weight in the range of about 80,000 to 100,000 for fibrous casing and about 95,000 to 115,000 for nonfibrous casing and a viscosity of 5,000 to 30,000 centipoises.

Accordingly, it is a principle object of the present invention to provide a cellulosic food casing article and method which eliminates the need to derivatize the cellulose used in forming the food casing.

SUMMARY OF THE INVENTION

It now has been unexpectedly found that nonderivatized cellulose solutions are suitable for use in making both cellulose and fibrous food casings. Nonderivatized cellulose in a molten state can be extruded as a tubular film into a nonsolvent liquid such as a water bath. For purposes of this specification "nonderivatized" cellulose means a cellulose which has not been subjected to covalent bonding with a solvent or reagent but which has been dissolved by association with a solvent or reagent through Van der Waals forces such as hydrogen bonding. "Nonsolvent" means a liquid which is not a cellulose solvent.

In the water bath, the nonderivatized cellulose precipitates and the resulting gel tube can be treated with water, a polyhydric alcohol such as glycerine, or other water soluble softening agent such as a polyalkylene oxide or a polyalkylene glycol prior to drying. Based on an evaluation of food casings extruded using the nonderivatized cellulose solution, it appears that such casings unexpectedly have a higher water permeability than casings of derivatized cellulose from the viscose process. Water permeability is of considerable importance for food casings since the processing of food stuffed casings often involves cooking or curing processes which require moisture and flavoring components to pass freely through the casing material. Moreover, based on an evaluation of casings of nonderivatized cellulose it appears that such casings are stronger than casings made with cellulose derived from the viscose process. Improving moisture permeability while maintaining or improving strength is unexpected since previous attempts to increase the water permeability of the casing made with derivatized cellulose resulted in a lowering of casing strength.

Casings made of a nonderivatized cellulose also have a greater resistance to tearing when wet than its viscose cellulose counterpart. Wet tear resistance is an important property for food casings as it is a measure of the ability of the casing to withstand abuse imparted by the rigors of shirring and stuffing. For example, it is not uncommon for poorly maintained stuffing equipment to nick or otherwise damage the casing during the stuffing process with the result that the casing tears and fails under the stuffing pressures. Consequently, it is important that the casing be able to receive some amount of damage without failing.

The nonderivatized cellulose can be utilized to form fibrous casing by flowing the NMMO-cellulose solution onto a paper web prior to precipitating the cellulose. This is surprising and unexpected because the NMMO-cellulose solution applied to the paper web does not cause a obvious visible degradation of the paper even though the NMMO component of the solution is a cellulose solvent.

The surprising advantages of a cellulose food casing which has improved wet tear resistance with no loss of strength or water permeability, which is sulfur free, and which is formed by a process that does not generate toxic and noxious by-products, are all attainable through the use of a nonderivatized cellulose to form the food casing.

In particular, the present invention is a cellulose food casing comprising a seamless extruded tubular film of a nonderivatized cellulose precipitated from a thermoplastic cyclic amine oxide solution and said tubular film containing a water soluble softener.

The invention also is characterized by a cellulosic food casing article having tubular wall with a water permeability at 25° C. of greater than about 1.2 ml/min/m²/mmHg and a wet tear strength greater than about 20 gm/0.1 mm of wall thickness.

In another aspect, the invention is characterized by a cellulosic food casing prepared by a method comprising:

a) providing a solution composed of nonderivatized cellulose in an amine oxide solvent;

b) downwardly extruding the solution from an annular orifice to form a seamless tube;

c) passing said extruded seamless tube of solution downwardly from the orifice first through an air gap and then into a bath of nonsolvent liquid;

d) introducing a non solvent liquid into the interior of said extruded seamless tube at a location below the annular orifice and above the surface of the bath of non solvent liquid;

e) downwardly flowing said nonsolvent liquid cocurrently with the inner surface of said downwardly moving extruded seamless tube of solution and into said bath as said tube moves through said air gap, and contacting the inner surface of said extruded, seamless tube with said nonsolvent liquid in the course of said cocurrent flow;

f) maintaining said extruded seamless tube of solution in said bath with its inner and outer surfaces in direct contact with said nonsolvent liquid thereby precipitating said nonderivatized cellulose from said solution and forming a nonderivatized cellulose tube; and g) removing said nonderivatized cellulose tube from said bath and contacting same with a water soluble softener.

The apparatus of the present invention is characterized by a) an extrusion nozzle having an annular extrusion outlet disposed and arranged for downwardly extruding a seamless tube composed of a thermoplastic solution of nonderivatized cellulose and an amine oxide cellulose solvent;

b) a bath of nonsolvent liquid disposed below said extrusion outlet for precipitating nonderivatized cellulose from said solution, the level of liquid in said bath and said extrusion outlet defining an air gap therebetween;

c) a cylindrical mandrel depending from said extrusion nozzle such that a said tube extruded from said annular extrusion outlet surrounds said mandrel and passes downwardly along said mandrel through said air gap and into said bath;

d) said mandrel including an upper portion and a lower portion;

e) said upper portion having a diameter smaller than the diameter of said extrusion outlet so the cylindrical surface of said upper portion is radially inwardly spaced from the nozzle surface of a said tube;

f) said lower portion having a diameter larger than said upper portion and a lowermost end face which is disposed below the level of liquid in said bath;

g) said upper portion having a porn opening in its cylindrical surface; and h) a first conduit within said mandrel and communicating with said port for conducting nonsolvent liquid to said pore whereby nonsolvent liquid issuing from said port flows down along the surface of said upper portion and lower portion and into said bath and in the course of said flow contacts the inner surface of a said extruded tube.

Food casing of nonderivatized cellulose were found to have all the desirable attributes of food casings heretofore formed of a derivatized cellulose. They imbibed water and are treated with glycerine or other softeners necessary to provide the casing with the pliability needed for processing; they are moisture permeable which is necessary for processing the food product stuffed into the casing; and they are extensible and able to be stuffed with a food product and to contain the food product during a cooking cycle without splitting. All these attributes are in addition to being more tear resistant than conventional cellulose casings and being completely-free of even trace amounts of process generated sulfur compounds.

DETAILED DESCRIPTION OF THE INVENTION

Several tests were conducted to establish the feasibility of using nonderivatized cellulose to form cellulose food casings and to determine the properties of food casings so formed.

For purposes of testing, applicant obtained a NMMO-cellulose solution from Courtaulds Research Ltd., Coventy England. The test solution or "dope" is a yellow/brown solid having a melting point of 60°–70° C. The Material Safety Data Sheet for the dope identifies it as containing, by weight, 70–80% NMMO, 10–20% cellulose and 5–15% water. It is believed the dope as supplied is made according to processes described in U.S. Pat. Nos. 4,145,532, 4,196,282 and 4,255,300 the disclosures of which are incorporated herein by reference.

The dope, received as slabs, was put into a freezer to increase its brittleness. It was then hammered into smaller pieces and ground to a particle size of less than about 1.58 mm in diameter. These particles were then loaded into a Brabendar Model 100 screw-type extruder feeding a die assembly arranged to extrude a tube approximately 25.4 mm in diameter. The extruder and die temperatures were held at about 105° C. The extruded dope was passed sequentially through a screen pack profile of 60/200/325/200/60 mesh screens located between the extruder and die. The screen pack prevents partly melted dope and other contaminants from being extruded and increased the residence time of the dope in the extruder. This insures that the dope is thoroughly melted prior to extrusion.

The die is positioned to extrude a tube downwardly into a water bath held at a temperature of about 15° C. Between the die and water surface was an air gap of about 50 mm. With this arrangement the extruder was operated at about 50 RPM at a feed rate of about 1.13 to 1.36 kg/hr. The residence mime of the extruded tube in the water bath was about one (1) minute and from the bath the tube was drawn through nip rolls and wound on a spindle.

Figure 1:
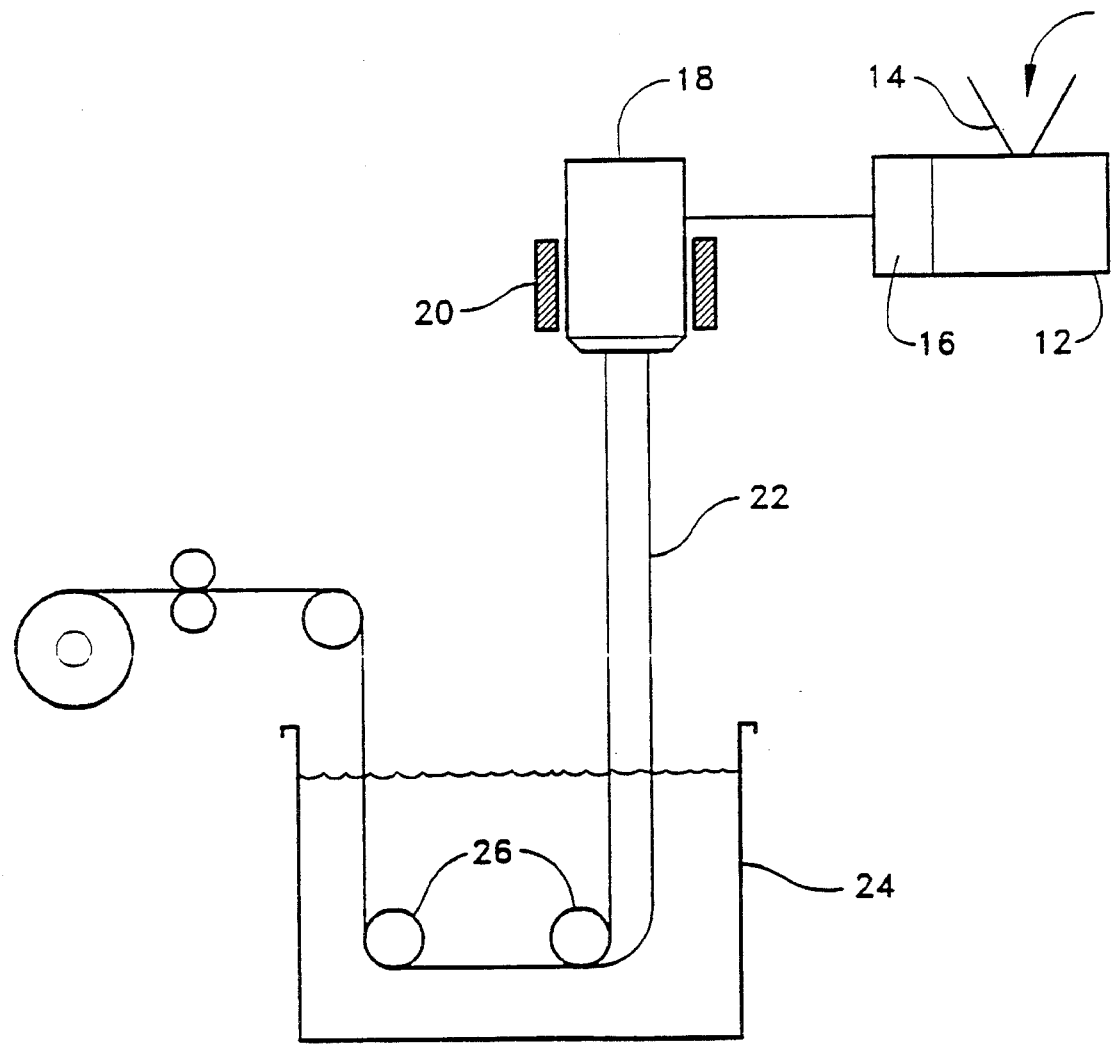
FIG. 1 is a schematic drawing showing an arrangement of apparatus for extruding the food casing of the present invention.

FIG. 1 illustrates the test apparatus used in a laboratory pilot operation. In this respect the extruder 12 includes a hopper 14 into which the pulverized dope is fed. The screen pack 16 is between the extruder and the die 18. Band heaters 20 adjacent the die maintain the die at about 105° C. as noted above. The die is oriented so the extruded tubular food casing 22 passes vertically down into water bath 24. As extrusion begins the tube is held open so it fills with water as it enters the bath and is laced around rollers 26. Water within the tube prevents the tube from blocking (i.e. self-adhering as it is flattened in its passage around rollers 26.

Figure 2:
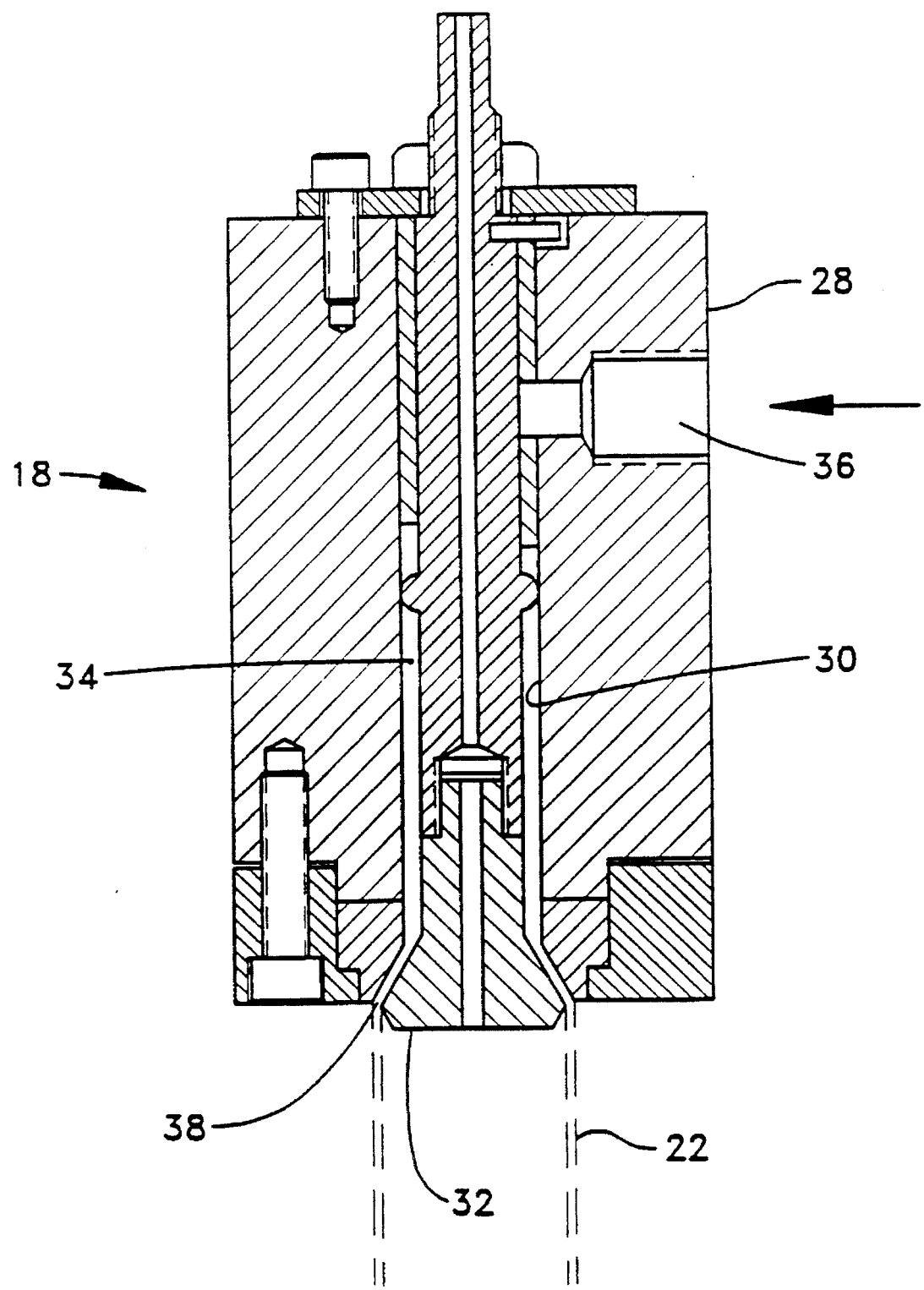
FIG. 2 is a view of an extrusion nozzle partly broken away and in section as used in the apparatus of FIG. 1.

The die 18 is shown in cross section in FIG. 2. The die includes an outer member 28 having a central bore 30. Centered within this bore is a plug 32. The plug and bore surface define an annular space 34 therebetween wherein the space at the outlet 38 defines a gap about 0.508 mm wide and 25.4 mm in diameter. Molten dope introduced into this space through inlet 36 flows down and around the plug and is extruded as a tube from outlet 38.

Tubes extruded in the manner described above were washed in water to remove all NMMO and then samples were soaked in a 10% glycerine solution for ten minutes. The tubes were then inflated with air and dried wherein the pressure of the inflating air was sufficient to maintain the tube open during drying. The wall thickness of the tubes extruded in this experimental operation were not as uniform as the wall thickness of commercially extruded viscose from a conventional casing manufacture. For example, in one casing sample formed of the nonderivatized cellulose dope, the wall thickness at points about its circumference ranged between 0.06 to 0.11 mm whereas a conventional derivatized viscose cellulose casing is a relatively uniform 0.06 mm chick. In any event, this test established that the derivatized dope could be extruded in tubes having a wall thickness down to at least 0.06 mm.

WATER PERMEABILITY

To analyze the water permeability characteristics, a length of the nonderivatized cellulose tube was soaked in water (25° C.) for about five minutes and thereafter discs 38 mm in diameter were cut from the soaked length. The soaked disc was inserted into an Ultrafiltration Cell as sold by Amicon Corporation (Model 52) having a polyethylene plate to support the test sample. Water at 25° C. under pressure of 500 mm Hg was introduced into one side of the cell. A pipette attached to the other side of the cell collected the water passing through the casing sample. The data collected was then used to calculate the water permeability of the test sample. The resulting calculation represents a water permeation or ultrafiltration rate per unit area per unit of applied pressure, the specific units being ml/min/m²/mmHg. Three samples of the nonderivatized cellulose were analyzed in this fashion. For purposes of comparison, a section of food casing of derivatized cellulose made according to the viscose process was obtained from a commercial production line for Viskase Corporation's NOJAX® casings while still in a gel state (after regeneration, rinsing and treating with glycerine but prior to drying). This gel casing was inflated with air to maintain it open during drying and thereafter it was subjected to the same permeability test. The calculation results are shown in Table I.

TABLE I

| | Ultrafiltration (ml/min/m²/mmHg) | |
|---|---|---|
| SAMPLE | NONDERIVATIZED | DERIVATIZED |
| 1 | 2.53 | 1.02 |
| 2 | 1.33 | 1.00 |
| 3 | 1.19 | 0.94 |
| Average | 1.68 | 0.98 |

The analyses results of Table I indicate that the water permeability of casing tested which was formed of the nonderivatized cellulose is greater than that of the derivatized samples.

STRETCH BURST

The strength of the nonderivatized cellulose casing was analyzed by a so called "stretch burst" test. This test involves soaking a section of the casing in room temperature water for thirty minutes to insure it is in a rewet condition. In its rewet condition one end of the sample is tied off and the sample is inflated with air at a rate of pressure increase of about 44.52 mmHg/sec until it bursts. The diameter increase during inflation and the diameter at burst are recorded. The sample of casing formed from nonderivatized cellulose tested had a rewet flat width of 49.5 mm (31.5 mm diameter). In the test it attained a diameter of about 48.0 mm and burst at an internal pressure of 203 mmHg.

For a burst pressure comparison, a length of derivatized cellulose food casing in a gel state was removed from a commercial production line after treating with glycerine hue prior no drying. This gel state casing was intended for production of a conventional frankfurter casing known as Viskase Corporarich's size 25N NOJAX® casing. This gel state casing was treated in the same manner as the nonderivatized casing noted above, i.e. inflated with air to facilitate drying with no attempt to orient it by inflating to impart a stretch to the casing. The casing then was rewet in the same manner as the nonderivatized cellulose casing sample and subjected to the stretch burst test. In its rewet condition the flat width of three samples averaged 35.47 mm (22.6 mm diameter). The average burst pressure was 271.33 mmHg and the average diameter at burst was 37.33 mm. The burst pressure was higher than that of the nonderivatized sample. However, all factors being equal, burst pressure is determined in part by casing diameter in that the smaller diameter casing will have the higher burst pressure. Accordingly, it is believed that this increase, at least in part, was due to the fact that the average diameter of the derivatized cellulose sample was smaller than the nonderivatized cellulose sample.

As a further attempt to compare burst pressures, two oriented casings of the Viskase Corporation formed of derivatized cellulose were selected for comparison of the rewet burst pressures. One known as Viskase size 40G NOJAX® casing was selected because it is specified as having a flat width (48.77 to 52.83 mm) comparable to the sample of nonderivatized cellulose. Viskase specifications for this size 40G casing includes a minimum burst pressure of 173 mmHg wherein burst pressure is determined according to the same procedure noted above. The second casing known as Viskase size HS 65 casing has a greater specified flat width of (55.37 to 65.02 mm) and the Viskase specifications for this size HS 65 casing includes a burst minimum pressure of 171 mmHg. These minimum values are lower than the burst pressure of 203 mmHg obtained when testing the casing of nonderivatized cellulose.

It also is known that a casing formed of derivatized cellulose has a higher burst pressure after orientation (by drying while inflated to stretch the casing) than without such orientation. The casings formed of nonderivatized cellulose used in the stretch burst test were hoe oriented whereas the specified burst pressure for the Viskase casings noted above are for oriented casings. Accordingly, it is believed that if oriented, the casings formed of the nonderivatized cellulose will have still higher burst pressures than comparable casings formed of derivatized cellulose. In view of the tests and comparisons made as noted above, it is believed that a casing formed of a nonderivatized cellulose has a burst pressure higher than the specified minimum burst pressure of the closest comparable casings formed of derivatized cellulose.

TEAR STRENGTH

Tear strength in both the machine (MD) and transverse (TD) directions of casing formed of nonderivatized cellulose also was tested. Samples to be tested were cut as rectangles from both nonderivatized cellulose and size 25N NOJAX® gel state casing extruded and treated as noted above. One group of three samples was taken such that one side (A) of each sample is cut perpendicular to the MD direction. A second group of three samples was taken such that one side (B) is cut perpendicular to the TD direction. A slit for initiating the tear was made in each sample. Each slit started at the middle of one side (A) or (B) and extended in the direction to be tested. The samples were soaked in demineralized water for thirty (30) minutes, measured for thickness and then fixed to a DuPont Pendulum-type tear tester. The sample is arranged so that when the pendulum of the instrument is released, the weight of the swinging pendulum will tear the sample in half wherein the tear is initiated by the slit cut into one side. A scale of the instrument records a value representing the tear force in gram-centimeters required to tear the sample. This value is used to calculate the tearing force per millimeter of film thickness.

Casings made of both derivatized and nonderivatized samples were tested using the same test procedures. The results of the tear test on samples formed of the derivatized cellulose are shown in Table II. Table III shows the results of tear tests on samples cue from tubular film formed of nonderivatized cellulose.

TABLE II

Tear Strength
(Derivatized Cellulose)

| | Sample Thickness (mm) | MD Tear Force (gm-cm) | gm-cm per 0.1 m |
|---|---|---|---|
| 1. | 0.063 | 10.5 | 16.6 |
| 2. | 0.063 | 10.9 | 17.3 |
| 3. | 0.065 | 12.5 | 19.2 |
| 4. | 0.066 | 13.2 | 20.0 |
| | | Average MD Tear Force/0.1 mm | 18.28 |

| | Sample Thickness (mm) | TD Tear Force (gm-cm) | gm-cm per 0.1 m |
|---|---|---|---|
| 1. | 0.065 | 18.0 | 27.6 |
| 2. | 0.066 | 21.4 | 32.4 |
| 3. | 0.066 | 19.4 | 29.3 |
| 4. | 0.066 | 19.6 | 29.7 |
| | | Average TD Tear Force/0.1 mm | 29.75 |

TABLE III

Tear Strength
(Nonderivatized Cellulose)

| | Sample Thickness (mm) | MD Tear Force (gm-cm) | gm-cm per 0.1 mm |
|---|---|---|---|
| 1. | 0.098 | 42.9 | 43.7 |
| 2. | 0.124 | 66.5 | 53.6 |
| 3. | 0.149 | 69.2 | 46.4 |
| | Average MD Tear Force/0.1 mm | 47.9 | |
| 1. | 0.120 | 35.7 | 29.8 |
| 2. | 0.154 | 73 | 47.4 |
| 3. | 0.160 | 67.3 | 42.1 |
| 4. | 0.169 | 103.4 | 61.2 |
| | Average TD Tear Force/0.1 mm | 45.1 | |

A comparison of the results show that on average, the tear strength per 0.1 mm of thickness is significantly greater in both the MD and TD directions for the tubular film formed of nonderivatized cellulose. Particularly, the MD tear strength on average is over 2.5 times greater and the TD tear strength is 1.5 times greater. This is important because as discussed above, wet near strength is an indication of the ability of the casing to withstand the rigors of stuffing. Tear strength also is important during casing converting operations prior to stuffing. For example food casings such as those used to process frankfurters and the like typically are converted by a shirring operation (i.e. longitudinally compressing into closely packed pleats) so as to gather a long length of casing into shorter tubular sticks. It is not uncommon for a shirring operation to compact upwards of sixty (60) meters of casing to a length of only 76 cm and the shirring process itself is conducted at speeds of up to 360 meters per minute. Accordingly, it is important that the casing be able to maintain physical integrity and not tear during the shirring operation. Thus for both processing (shirring) and stuffing considerations, it is desirable to have a casing with high tear strength.

Stuffing tests were conducted to determine if casings made of a nonderivatized cellulose were suitable for food processing. Several pieces of the casing, formed, treated with glycerine and dried as noted above, were tied at one end and hand stuffed with a high collagen frankfurter emulsion. Some casings split on stuffing due to weak spots caused by pinholes or bubbles in the casing wall. Those samples which were successfully stuffed were processed after stuffing by cooking at 82° C. and 40% RH for 75 minutes to simulate conditions in a commercial operation. Casings of nonderivatized cellulose, stuffed and processed in this fashion, did not split or otherwise rupture during cooking, indicating a suitability for use as food casings.

The die used to produce casing for the previous tests was replaced with a nozzle arrangement having some features similar to a nozzle used in the production of cellulosic frankfurter casing from viscose. A typical viscose extrusion nozzle for producing cellulose food casing includes a self centering mandrel which extends out from the body of the nozzle. The nozzle is located below the level of the regenerating liquid and is oriented so the extruded viscose tube passes vertically upward from the nozzle and along the mandrel up and out of the regenerating liquid.

For purposes of extruding the molten nonderivatized dope, modifications as described hereinbelow were made to facilitate the extrusion of the more viscous thermoplastic dope of nonderivatized cellulose and the nozzle was arranged to extrude downwardly into the nonsolvent bath.

Figure 3:
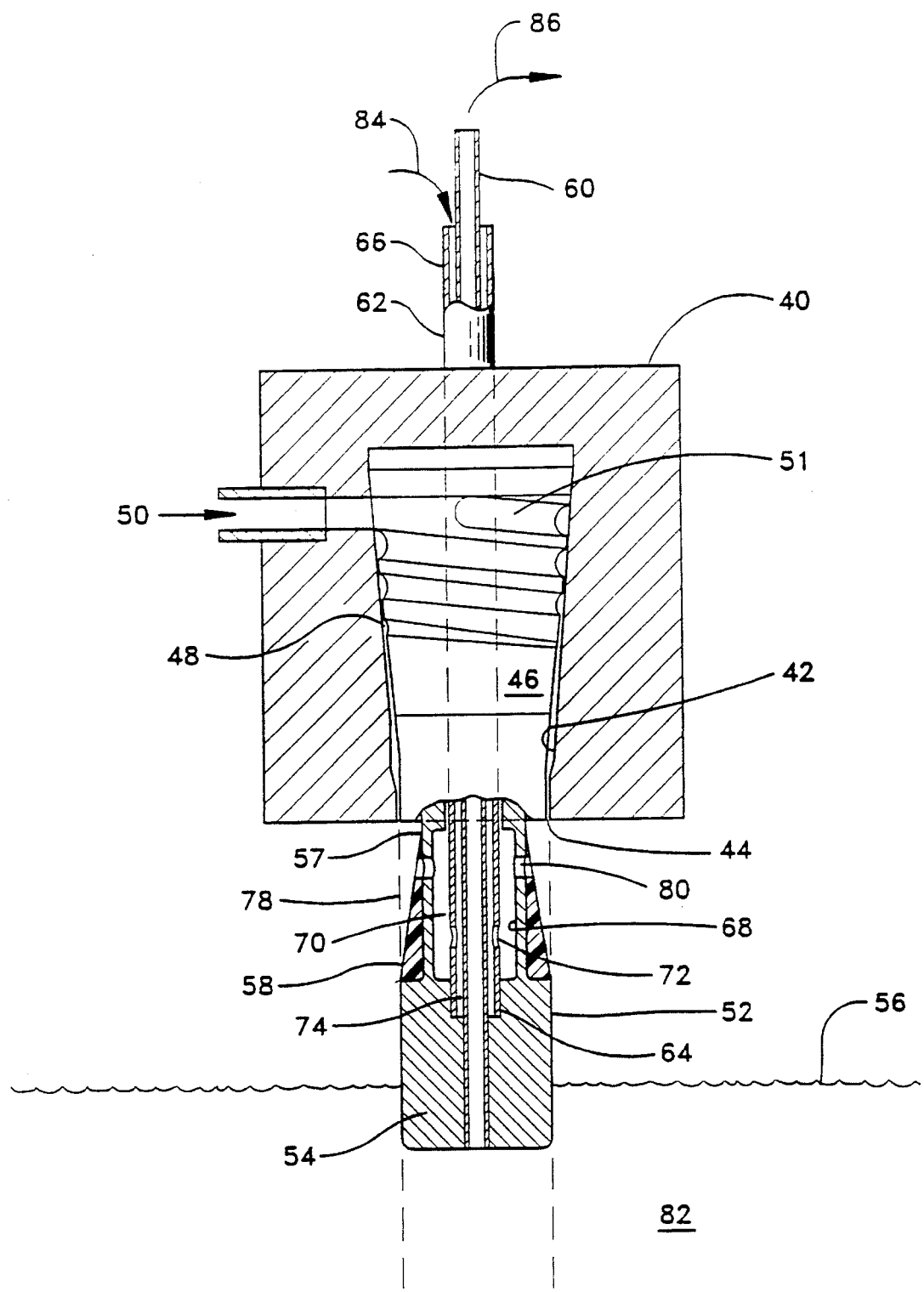
FIG. 3 is a view similar to FIG. 2 showing an alternate extrusion nozzle.

FIG. 3 shows the extrusion nozzle to include an outer member 40 having a central bore 42 which tapers towards an outlet 44. Centered within the bore is a tapered plug 46. An annular extrusion passage 48 is defined between the plug and the bore surface wherein the passage outlet 44 is about 0.25 mm wide and about 23.6 in diameter.

The molten dope from the extruder (FIG. 1) enters extrusion passage 48 through an inlet port 50 and then flows around and along the plug to the extrusion passage outlet. The surface of the plug is provided with a spiral channel 51 intended to facilitate the even distribution and passage of the molten dope around and along the plug.

Extending axially from the plug and out of the bore is a hollow mandrel 52. The lowermost end portion 54 of the mandrel, in use, is disposed below the level of the precipitating liquid indicated at 56.

The lowermost end portion 54 has a diameter about equal to the diameter of the extrusion passage outlet 44. However, a length of the mandrel between its lowermost end portion and the extrusion outlet is relieved to provide a seat 57. Retained in this seat is a sleeve 58 formed of a relatively low friction material such as tetrafluroethylene (TFE). The sleeve is tapered from a smaller end adjacent the extrusion outlet 44 to a larger end which matches the diameter of the mandrel end portion 54. The tapered, low friction surface provided by this sleeve facilitates the passage of the extruded tube along the mandrel and into the precipitating liquid.

FIG. 3 further shows that a central conduit 60 extends axially completely through the mandrel and plug. A second conduit 62, disposed concentrically about the first and which extends upward through the plug has a closed lower end 64 and an upper end 66 which is open. This second conduit 62 and the inner wall 68 of the hollow mandrel define an annular channel 70 therebetween. A first port 72 in the wall of the second conduit connects the space 74 between the concentric conduits 60, 62 to the space 70 between the second conduit and the inner surface of the hollow bore. A second port 80 extends through the wall of the mandrel and the sleeve. This second port 80 is located adjacent the smaller sleeve diameter and above the level of the nonsolvent precipitating liquid.

The concentric conduits 60, 62 permit the circulation of the precipitating liquid to the interior of the extruded nonderivatized cellulose. In particular, the precipitating liquid from bath 82 is pumped, by means not shown, into the space 74 between the concentric conduits through its open top 66 as indicated by arrow 84. This liquid flows through port 72 into space 70 and then out of the mandrel through port 80. This liquid, which flows down along the surface of the sleeve 58 and the mandrel lower portion 54, performs several functions. First it lubricates to facilitate the passage of the extruded nonderivatized cellulose tube (represented in FIG. 3 by dashed line 78) down along the mandrel and into the bath 82. It also fills the extruded tube to facilitate precipitation of the cellulose at the inner surface of the extruded tube. The liquid from within the extruded tube is pumped out through the central conduit 60 as indicated by arrow 86 and back to the bath.

Using this extrusion nozzle with the same dope and extrusion conditions as previously noted, a tube of the NMMO-cellulose solution was extruded into a 25° C. bath containing 30% NMMO and 70% water by volume. At this concentration, the combination of water and NMMO is a nonsolvent for the cellulose.

The residence time of the extruded tube in the bath was about one (1) minute. This was sufficient to precipitate the nonderivatized cellulose from the solution. The extruded tube was then washed with water and immersed in a 10% glycerine solution for ten minutes. The tube was then inflated with air and dried to produce casing samples for testing. The casing sample produced in this manner contained 38% glycerine by weight of dry cellulose and had a flat width after rewetting of about 30.7 mm (19.57 mm diameter). These casings were then subjected to the same permeability, stretch-burst and tear tests as previously described.

A conventional gel state casing of derivatized cellulose was used as a control. This gel state casing, was taken from the production line of Viskase Corporation for manufacturing its size 25N NOJAX® casing because the specified flat width (26.9 mm) diameter (17.2 mm) of this size casing is close to the flat width and diameter of the casing of nonderivatized cellulose produced with the modified extrusion nozzle. The gel state casing was taken at a stage of production after contacting with glycerine and before drying. At this stage the casing has about 13–14% glycerine. It was then inflated just to hold it open and air dried. The resulting casing of the derivatized cellulose had a rewet flat width of 29.46 mm (18.76 mm diameter) so it was still slightly smaller in diameter than the nonderivatized cellulose sample.

The nonderivatized casing produced with the modified extrusion nozzle was thinner and more uniform than previous samples produced. Table IV shows the thickness of eight rewet samples measured at three points around its diameter.

TABLE IV

| | Casing Wall Thickness (mm) | | | |
|---|---|---|---|---|
| Sample | 1 | 2 | 3 | Average |
| 1 | 0.060 | 0.058 | 0.050 | 0.056 |
| 2 | 0.104 | 0.072 | 0.083 | 0.084 |
| 3 | 0.058 | 0.065 | 0.049 | 0.057 |
| 4 | 0.078 | 0.087 | 0.053 | 0.073 |
| 5 | 0.056 | 0.053 | 0.042 | 0.050 |
| 6 | 0.056 | 0.053 | 0.042 | 0.050 |
| 7 | 0.067 | 0.066 | 0.049 | 0.061 |
| 8 | 0.039 | 0.062 | 0.051 | 0.051 |

Table IV shows casings were produced having a wall thickness on average of as small as 0.050 mm with a wall thickness uniformity better than that produced by the die of FIG. 2. On average, the wall thickness of these eight samples ranged from 0.050 mm to 0.084 mm whereas the samples produced using the die of FIG. 2 had a thickness of between 0.06 to 0.11 mm. The results of water permeability, tear and stretch burst test tests conducted on the samples are shown in Table V.

TABLE V

| | Ultrafiltration (ml/Min/m²/ mmHg) | Stretch Burst Pressure dia at burst | | Tear Strength* gm per 0.1 mm | |
|---|---|---|---|---|---|
| | | mmHg | mm | MD | TD |
| nonderivatized | 1.66 | 145 | 27.18 | 15.3 | 29.9 |
| derivatized | 0.72 | 293 | 44.45 | 17.6 | 34.6 |

*average of 4

Table V indicates that while water permeability (ultrafiltration) was higher for the casings of nonderivatized cellulose, the stretch burst and tear strengths of the nonderivatized cellulose casings produced with the modified nozzle were lower than the derivatized cellulose counterpart. It is believed that the lower stretch burst and tear strength of the nonderivatized cellulose casing as reported in Table V is attributable to both its higher ultrafiltration value (1.66 vs 0.72), and higher glycerine content (38% vs 13–14%) because increasing both are known to have an adverse affect on casing strength. It further is believed the strength of casing of the nonderivatized cellulose would have been above that of the derivatized cellulose casing samples at equivalent glycerine content.

DRAW DOWN TEST

A draw-down test also was conducted to evaluate the suitability of the nonderivatized cellulose for use in the production of fibrous casing. The draw-down test is used to screen papers and viscose solutions to determine suitability for fibrous casing manufacture. In the test, a section of paper used in forming fibrous casing is placed on a flat plate. The liquid to be tested (usually a viscose solution) is poured onto the paper and the paper is drawn beneath a metering bar which squeezes the liquid to a uniform thickness over the paper surface. The coated paper is stretched over a hoop and immersed in a coagulating and regenerating solution, rinsed and then dipped into a bath containing a glycerine solution. An examination then is made to determine whether the coating liquid has penetrated and bonded with the paper. Both of these characteristics (e.g. penetration and bonding) are essential for successful fibrous casing manufacture. If penetration and bonding are observed, then the materials would be suitable for manufacturing a fibrous casing.

For purposes of testing the nonderivatized cellulose, the NMMO-cellulose dope as described above was melted (105° C.) and diluted with a 78% NMMO aqueous solution to produce a solution containing about 5% by weight of cellulose. A sheet of conventional viscose bonded, long fiber 11 pound per ream weight hemp paper (0.030 mm thick) obtained from C. H. Dexter Co., Windsor Locks, Conn. and used in making commercial fibrous cellulose casing was placed on a flat plate and heated to 105° C. The solution was poured onto the paper and the paper was drawn under a horizontal bar spaced 1.02 mm above the plate so the paper was coated with the solution to a thickness of slightly less than 1 mm. After a few seconds the hoop was immersed into flowing tap water for about 10 minutes to precipitate the cellulose. The hoop then was immersed into a 10% glycerine solution for fifteen minutes and oven dried (105° C.).

Visual inspection of the noncoated side of the paper indicated that there was acceptable penetration of the nonderivatized cellulose through the paper and the cellulose did bond to the paper. As noted above, these characteristics are essential for successful fibrous casing manufacture. So by this draw-down test, the nonderivatized cellulose is suitable for manufacturing a fibrous cellulosic casing. Also, the visual inspection surprisingly found no obvious deterioration of the paper substrate. This was unexpected because the solution applied to the paper contained NMMO which is a cellulose solvent.

A second sample formed of a 7.3% derivatized (cellulose xanthate) solution was used in a draw-down test with the same 11 pound per ream weight paper. The bar was set to a height of 0.762 mm. While the coating was thinner, about the same amount of total cellulose was applied to the paper because the cellulose concentration of the solution was greater. The coating on the second sample was coagulated and regenerated by immersion in baths containing salts and sulfuric acid and then it was rinsed with water, treated with glycerine and dried.

Tensile tests were conducted on both samples as well as on a control consisting of the paper treated only with a 10% glycerine solution and dried. The results of tests conducted on 25.4 mm wide samples are reported in Table VI.

TABLE VI

| | Tensile Strength | |
|---|---|---|
| | Thickness After Drying (mm) | Load at Failure (kg) |
| Control | 0.030 | 2.8 |
| Sample 1* | 0.210 | 5.5 |
| Sample 2** | 0.125 | 7.8 |

*Paper coated with nonderivatized cellulose
**Paper coated with derivatized cellulose (viscose)

The results of the test show that the nonderivatized cellulose and the viscose add-on both increased the load bearing ability of the casing over uncoated paper although the increase of the sample coated with nonderivatized cellulose was less. The load at failure for Sample 1 formed of the nonderivatized cellulose was about 70% the load at failure of the derivatized cellulose sample. Despite this lower value it is believed that the penetration and bonding characteristics indicate that a commercially acceptable fibrous casing can be formed of the nonderivatized cellulose because the nonderivatized cellulose improved the strength of the base paper and this would be sufficient to satisfy the strength needs of fibrous casing users.

It should be appreciated that a food casing article of nonderivatized cellulose represents an advance in the art. Since no sulfur or sulfur compound is used or generated in forming the casing as described herein, the resulting casing is sulfur free. It also appears that the tear strength, water permeability and burst pressure of the nonderivatized cellulose casing are superior to a conventional food casing formed of a derivatized cellulose such as is formed by regenerating the cellulose from a cellulose xanthate solution. Since there are no toxic or noxious by-products generated by the manufacture of the casing, the manufacturing process imposes no burden on the environment and represents an advance in the art of cellulose casing manufacture.

Having described the invention in detail, what is claimed as new is:

1. Apparatus for forming a seamless tubular cellulose food casing film comprising:
    a) an extrusion nozzle having an annular extrusion outlet disposed and arranged for downwardly extruding a seamless tube composed of a thermoplastic solution of nonderivatized cellulose and an amine oxide cellulose solvent;
    b) a vessel disposed below said extrusion outlet, said vessel having a closed bottom and an open top for receiving said seamless tube being downwardly extruded from said annular extrusion outlet and said vessel containing a bath wherein the level of liquid in said bath and said extrusion outlet define an air gap therebetween;
    c) said bath being composed of a nonsolvent liquid which causes a precipitation of cellulose from said thermoplastic solution upon contact therewith;
    d) a cylindrical mandrel depending from said extrusion nozzle such that said seamless tube being extruded from said nozzle surrounds said mandrel and passes downwardly along said mandrel and through said air gap into said vessel with a portion of the seamless tube below a lowermost end face of said mandrel becoming filled with the nonsolvent liquid in said bath;
    e) means in said vessel and below the level of said mandrel lowermost end face for turning said seamless tube upwardly such that it passes up and out of said bath through said vessel open top;
    f) said mandrel having an upper portion and a lower portion, said upper portion including a cylindrical outer surface and being smaller in diameter than said extrusion outlet so the cylindrical surface of said mandrel upper portion is spaced radially inward from an inner surface of said seamless tube and said mandrel upper portion having a port opening in said cylindrical outer surface;
    g) said mandrel lower portion having a diameter larger than said mandrel upper portion and said mandrel lowermost end face being disposed below the level of liquid in said bath;
    h) a first conduit within said mandrel and communicating with said port for conducting nonsolvent liquid to said port and the nonsolvent liquid issuing from said port flowing down along the outer surface of said mandrel upper and lower portions and in the course of said flow contacting the inner surface of said seamless tube and thereafter said nonsolvent liquid passing off of said mandrel and entering into that portion of the nonsolvent liquid of said bath which is disposed within said seamless tube; and
    i) a second conduit being disposed concentrically within said first conduit and extending axially up through said mandrel, said second conduit having a lower end which terminates at an inlet in said mandrel lowermost end face providing for the upward removal of nonsolvent liquid from that portion of said bath disposed within said seamless tube.

2. Apparatus as in claim 1 including a plurality of ports spaced around said mandrel upper portion, each of said ports communicating with said first conduit.

3. Apparatus as in claim 1 wherein said mandrel has an outwardly tapered transition section extending from the smaller diameter of said upper portion to the larger diameter of said lower portion.

4. Apparatus as in claim 1 wherein:
   a) said extrusion nozzle has a bore tapered towards said annular extrusion outlet and an inlet for said solution communicating with said bore at a location longitudinally spaced from said annular extrusion outlet; and
   b) a plug in said bore which has an outer surface that tapers toward said extrusion outlet, the adjacent surfaces of said bore and plug defining an extrusion passage for said solution which terminates at said annular extrusion outlet.

5. Apparatus as in claim 4 wherein said mandrel extends axially from said plug and said conduits pass from said mandrel and up through said plug.

6. Apparatus as in claim 4 wherein said plug has its outer surface provided with a spiral groove for conveying and distributing said solution uniformly throughout said extrusion passage.

7. Apparatus for forming a seamless cellulosic tube of nonderivatized cellulose suitable for use as a food casing from a solution of nonderivatized cellulose and an amine oxide solvent comprising:
   a) a vessel having an open top and containing a bath of nonsolvent liquid for precipitating nonderivatized cellulose from said solution;
   b) an extrusion nozzle disposed above the level of liquid in said bath and having an annular extrusion outlet arranged to extrude a seamless tube of said solution downwardly through the open top of said vessel and into said bath such that a portion of the extruded seamless tube in said vessel falls with liquid from said bath, said annular extrusion outlet and the level of liquid in said bath defining an air gap therebetween;
   c) a mandrel depending from said extrusion nozzle and extending through said air gap into said bath such that said seamless tube being extruded from said noble surrounds said mandrel;
   d) said mandrel including an upper portion having a diameter smaller than said annular extrusion outlet such that an outer surface of said mandrel upper portion and an inner surface of said seamless tube extruded from said annular outlet define an annular space therebetween, and said mandrel upper portion outer surface having a port opening into said annular space;
   e) said mandrel including a lower portion having a larger diameter than said mandrel upper portion and a lowermost end face which is disposed below the level of liquid in said bath, and an inlet in said mandrel lowermost end face which opens into said bath;
   f) a first conduit extending into said mandrel for conducting nonsolvent liquid to said port and the nonsolvent liquid issuing from said port flowing downwardly in concurrent direct contact with the inner surface of said seamless extruded tube and then into the liquid of said bath within said seamless tube;
   g) a second conduit extending through said mandrel and communicating with said inlet for removing nonsolvent liquid from the liquid of said bath within said seamless extruded tube; and
   h) means in said vessel and below the level of said bath for turning said downwardly moving seamless tube such that it passes upwardly from said bath and out of said vessel through said open top.

* * * * *

UNITED STATES PATENT AND TRADEMARK OFFICE
CERTIFICATE OF CORRECTION

PATENT NO. : 5,597,587
DATED : JANUARY 28, 1997
INVENTOR(S) : MYRON D. NICHOLSON ET AL

It is certified that error appears in the above-identified patent and that said Letters Patent is hereby corrected as shown below:

In col. 16, line 2, delete "falls" and insert --fills--.

In col. 16, line 8, delete "noble" and insert --nozzle--.

Signed and Sealed this

First Day of April, 1997

Attest:

BRUCE LEHMAN

Attesting Officer

Commissioner of Patents and Trademarks